Patented May 12, 1931

1,804,663

UNITED STATES PATENT OFFICE

CONRAD H. ZIERDT, OF ROSEDALE, PENN TOWNSHIP, ALLEGHENY COUNTY, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL APPARATUS

Application filed March 4, 1930. Serial No. 433,081.

My invention relates to electrical apparatus, and particularly to apparatus of the type involving a direct current load, a main source of supply for said load involving a source of alternating current and a rectifier, and an auxiliary source of supply for said load in the form of a primary or a secondary battery.

I will describe two forms of apparatus embodying my invention, and will then point out the novel features thereof in claims.

Figure 1:
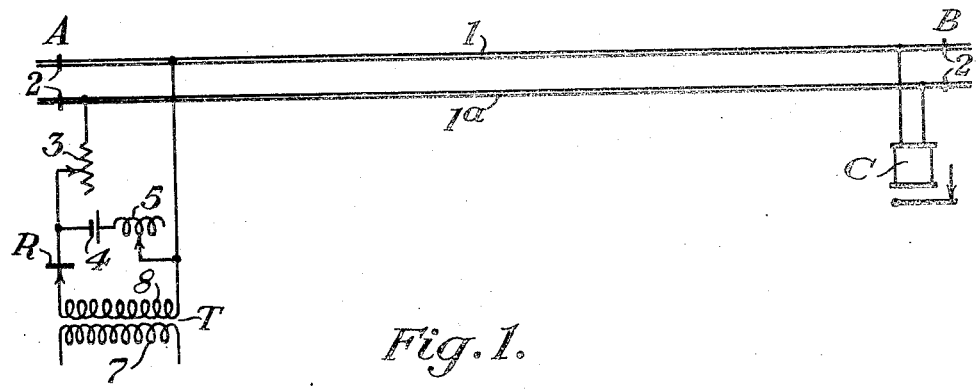
Figure 2:
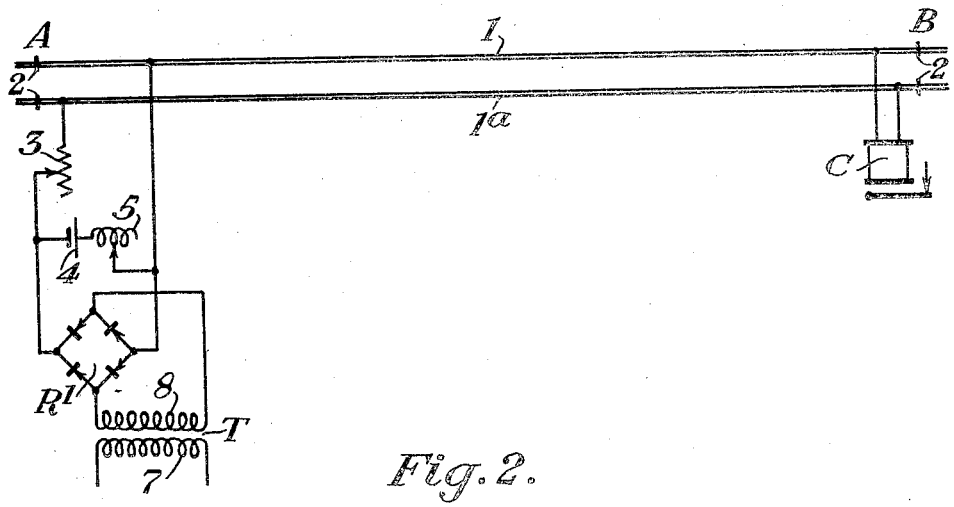

In the accompanying drawings, Fig. 1 is a diagrammatic view showing one form of electrical apparatus embodying my invention. Fig. 2 is a view similar to Fig. 1, but showing a modification also embodying my invention.

Similar reference characters refer to similar parts in each of the views.

Referring first to Fig. 1, the reference characters 1 and 1$^a$ designate the track rails of a railway track, which rails are divided by insulated joints 2 to form a section A—B. Connected across the rails at one end of the section is a direct current track relay C, which constitutes a direct current load. Located at the other end of the section is a transformer T, the primary 7 of which is connected with a source of alternating current which is not shown in the drawings. The secondary 8 of the transformer T is connected across the track rails through a half-wave rectifier R and a current-limiting resistance 3, the rectifier R preferably being of the copper oxide type. A battery 4 and an adjustable inductive reactor 5 are connected in series across the secondary circuit of transformer T between the recifier R and the current-limiting resistance 3.

If the battery 4 is a primary battery, the reactor 5 may be adjusted so that when the resistance of the ballast of the track section A—B is high, a small amount of unidirectional current passes through the battery 4, that is, the entire load is supplied by the transformer T and the rectifier R. When the track balast becomes wet, however, so that its resistance is reduced, the transformer and rectifier will furnish the major portion of the current taken by the load, and the battery 4 will furnish the rest of this current. If the source of alternating current fails, the primary battery will, of course, furnish the entire current required by the load. The reactor 5 preferably has a very low ohmic resistance, so that it will not interfere to an appreciable extent when the load is being furnished by the battery 4.

Referring now to Fig. 2, the apparatus is the same as that shown in Fig. 1, except that a full-wave rectifier R$^1$ is interposed between the transformer T and the track rails of the section A—B. The adjustment and the operation of the apparatus shown in Fig. 2 are similar to the adjustment and operation of the apparatus shown in Fig. 1.

It is probable that the saturation of the reactor 5 by the direct current flowing from the battery 4 under maximum load conditions tends to reduce the impedance of the reactor, giving an increased charge to the battery during a portion of the alternating current cycle. It may also be that the impedance of the reactor 5 to the pulsating current flowing from the battery 4 under maximum load conditions tends to give the battery more nearly the same voltage regulation characteristics under load as those of the rectifier, thereby tending to maintain the same balance between the portions of the load carried by the rectifier and by the battery under all load conditions.

Regardless of the theory of operation, however, I have found that apparatus embodying my invention materially increases the length of life of the primary battery to a greater extent than is possible with any other circuits of which I am aware.

When the battery 4 is a secondary battery, the reactor 5 is adjusted so that the battery is supplied with a small charging current under all ballast conditions within a wide range, so that the rectifier takes the track circuit load under all conditions in such range and also supplies the energy for charging the battery. Of course the battery will supply the track circuit load if the alternating current supply should fail.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a direct current load, a transformer having its primary connected with a source of alternating current and its secondary connected with said load through a rectifier and a current limiting resistance, and a battery and an inductive reactor connected in series across the secondary circuit of said transformer between said rectifier and said resistance.

2. In combination, a direct current load of variable resistance, a transformer having its primary connected with a source of alternating current and its secondary connected with said load through a rectifier, and a current limiting resistance, and a primary battery and an inductive reactor connected in series across the secondary circuit between said rectifier and said resistance, the parts being so adjusted that when the resistance of the load is high the transformer supplies the entire current taken by the load and also supplies a small amount of current to the battery whereas when the resistance of the load is low the transformer and the battery both supply current to the load.

3. In combination, a section of railway track, a direct current track relay connected across the rails of said section, a transformer having its primary connected with a source of alternating current and its secondary connected across the rails of said section through a rectifier and a current limiting resistance, and a battery and an inductive reactor connected in series across the secondary circuit of said transformer between said rectifier and said resistance.

4. In combination, a direct current track circuit, a transformer having its primary connected with a source of alternating current, and its secondary connected with the rails of said track circuit through a rectifier and a current limiting resistance, and a primary battery and an inductive reactor connected in series across the secondary circuit of said transformer between said rectifier and said resistance, the parts being so adjusted that when the track ballast is dry the transformer supplies the entire current taken by the track circuit and also supplies a small amount of current to the battery whereas when the track ballast is wet the transformer and the battery both supply current to the track circuit.

5. In combination, a direct current load, a transformer having its primary connected with a source of alternating current and its secondary connected with said load through a half-wave rectifier and a current limiting resistance, and a battery and an inductive reactor connected in series across the secondary circuit of said transformer between said rectifier and said resistance.

6. In combination, a direct current load, a transformer having its primary connected with a source of alternating current and its secondary connected with said load through a full-wave rectifier and a current limiting resistance, and a battery and an inductive reactor connected in series across the secondary circuit of said transformer between said rectifier and said resistance.

7. In combination, a section of railway track, a direct current track relay connected across the rails of said section, a transformer having its primary connected with a source of alternating current and its secondary connected across the rails of said section through a half-wave rectifier and a current limiting resistance, and a battery and an inductive reactor connected in series across the secondary circuit of said transformer between said rectifier and said resistance.

8. In combination, a section of railway track, a direct current track relay connected across the rails of said section, a transformer having its primary connected with a source of alternating current and its secondary connected across the rails of said section through a full-wave rectifier and a current limiting resistance, and a battery and an inductive reactor connected in series across the secondary circuit of said transformer between said rectifier and said resistance.

In testimony whereof I affix my signature.

CONRAD H. ZIERDT.